—— 0.04% 11 S component
---- 0.04% 11 S component + 0.007% phytic acid (5 g. phytic P/100 g. protein.)

—— 0.04% 9 S component
---- 0.04% 9 S component + 0.007% phytic acid (5 g. phytic P/100 g. protein.)

INVENTORS
GUILLERMO A. IACOBUCC.
DIRCK V. MYERS
KAZUYOSHI OKUBO
BY: John R. Martin
ATTORNEY

FIG 3

Digestion of soybean proteins with molsin
pH 2.8, 25°C, S/E = 140.
Open symbols: Soybean protein high in phytic acid (1.13% phosphorous)
Closed symbols: Soybean protein low in phytic acid (0.3% phosphorous)

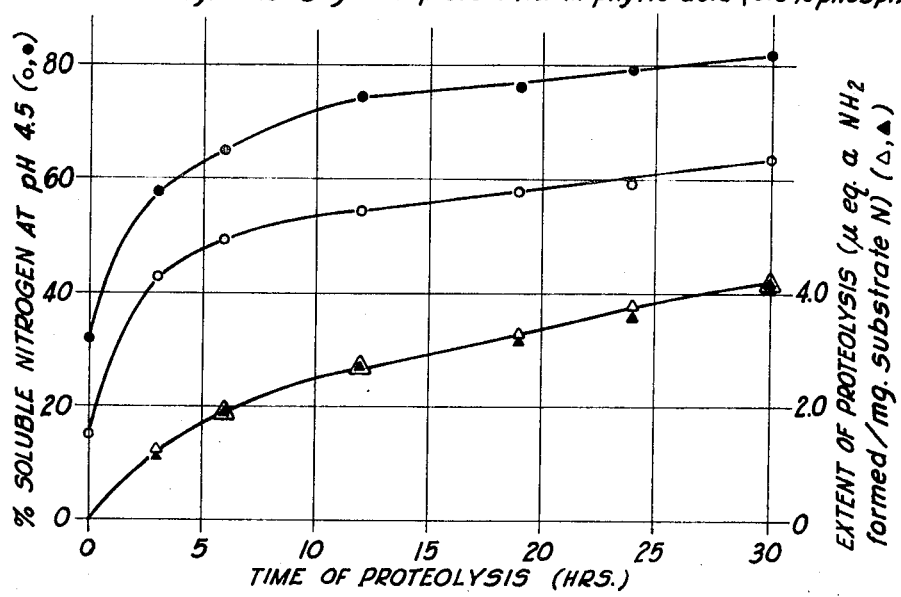

FIG 4

Digestion of soybean proteins with thermolysin
pH 8.0, 65°C., S/E = 100.
Open circles: Soybean protein high in phytic acid (commercial soy protein isolate 10.8% phosphorous
Closed circles: Soybean protein low in phytic acid (0.3% phosphorous)

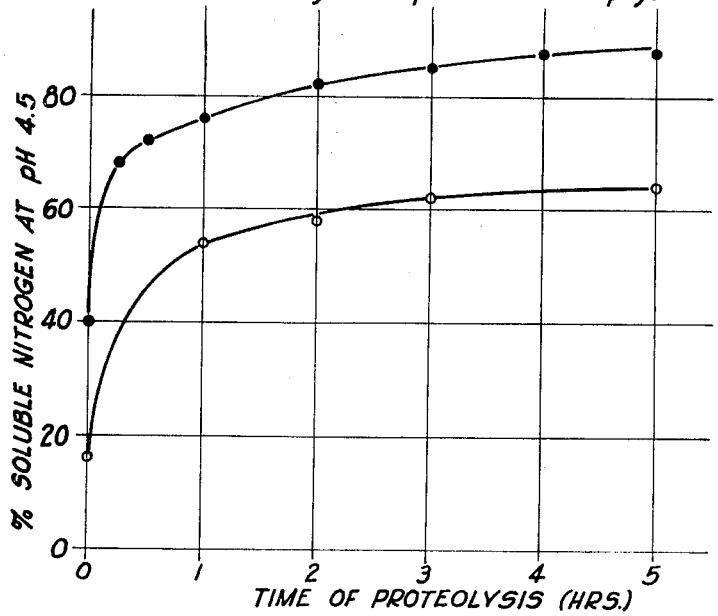

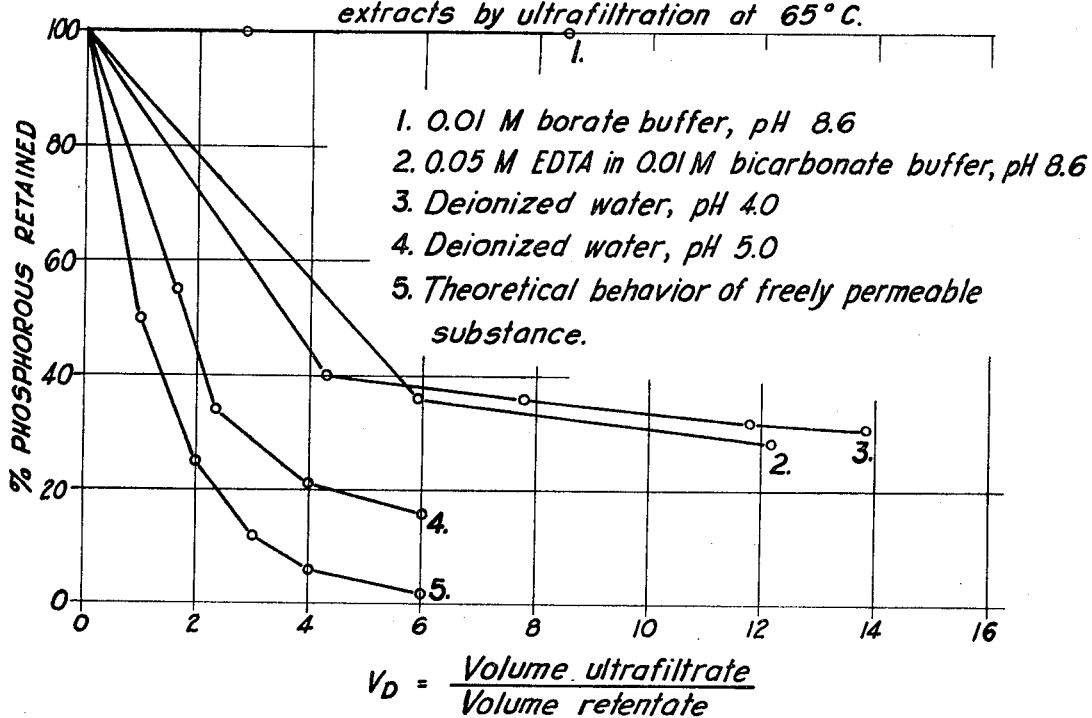

FIG 5 Removal of phytic acid from soybean meal extracts by ultrafiltration at 65°C.

1. 0.01 M borate buffer, pH 8.6
2. 0.05 M EDTA in 0.01 M bicarbonate buffer, pH 8.6
3. Deionized water, pH 4.0
4. Deionized water, pH 5.0
5. Theoretical behavior of freely permeable substance.

$V_D = \dfrac{\text{Volume ultrafiltrate}}{\text{Volume retentate}}$

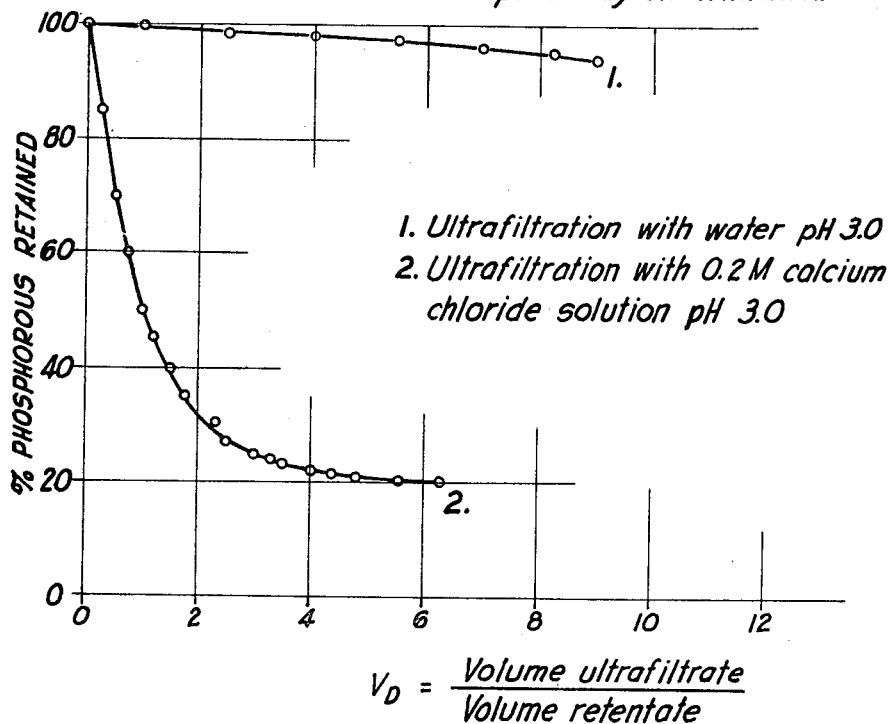

FIG 6 Removal of phytic acid from soybean meal extracts at pH 3.0 by ultrafiltration 1. Ultrafiltration with water pH 3.0
2. Ultrafiltration with 0.2 M calcium chloride solution pH 3.0

$V_D = \dfrac{\text{Volume ultrafiltrate}}{\text{Volume retentate}}$

United States Patent Office 3,736,147
Patented May 29, 1973

3,736,147
PROCESS FOR PREPARING PROTEIN PRODUCTS
Guillermo Arturo Iacobucci, Dirck van Buren Myers, and Kazuyoshi Okubo, Atlanta, Ga., assignors to The Coca-Cola Company, Atlanta, Ga., and Kikkoman Shoyu Co., Ltd., Tokyo, Japan, fractional part interest to each
Filed Apr. 5, 1971, Ser. No. 131,328
Int. Cl. A23j 1/14
U.S. Cl. 99—17
14 Claims

ABSTRACT OF THE DISCLOSURE

A process is provided for preparing plant protein products having low phytic acid content by subjecting protein isolates to ultrafiltration in the presence of a suitable chemical reagent.

The present invention relates generally to vegetable proteins, and more particularly to a method for preparing plant protein products having low phytic acid content.

DESCRIPTION OF PRIOR ART

The proteins of plant seeds, in particular those of cereals and legumes, have been a major source of human protein nutrition. It is recognized that, in the face of the present protein deficiency affecting more than half of the human race, new sources of vegetable proteins adaptable for human consumption must be developed.

Oilseed proteins of the type present in soybeans, peanuts, cottonseed, sesame, sunflower, coconut and the like are available as byproducts of the manufacture of edible vegetable oil, and represent a sizeable amount of protein (estimated at 20 million tons per year) not yet used for human consumption. Even though almost exclusively used for animal feeding, they represent the best alternative available at present for human consumption. Extensive literature deals with the nutritive values of such proteins and their proven effects in correcting protein malnutrition in children (for a review see M. Swaminathan, Pl. Fds. Hum. Nutr. 1,205 (1969)).

In protein isolation, proper attention must be given to the processing conditions, particularly pH and temperature, in order to preserve the chemical integrity of the amino acids and the water dispersibility of the native proteins and to prevent side reactions that could affect the gastro-intestinal digestibility of the proteins. Usually the oil present in the seed is extracted first by means of a low boiling solvent such as n-hexane, in order to minimize the exposure of the proteins to heat. Solvent defatted meals, extracted at low temperature, have their proteins in the native state and retain the full enzymatic activity originally present in the raw oilseed. Defatted materials of this kind are extensively used for the isolation of pure protein fractions, generally referred to as protein isolates. For example, the conventional practice for preparing soybean protein isolate utilizes aqueous extractions at pH near neutrality or slightly alkaline, at water to meal ratios conducive to the optimal dispersion of the proteins in the aqueous medium, for example a 10:1 ratio of water to meal, by weight. The extract is separated from the fibrous residue by filtration or centrifugation, and the pH of the clarified extract is then lowered to pH 4.5 to precipitate the major globular proteins. The protein curd is separated, washed with water and dried using conventional operations. Proximate analysis of the dried products indicates protein purities in the range of 95–98%.

In general, the commercial soybean protein isolates have shown nutritional qualities inferior to the defatted soybean meals from which they were prepared. This is primarily due to reductions in the content of the amino acids methionine and cystine, as a result of the chemical fractionations which occur in the extraction and precipitation steps. Such fractionations result in protein yields from meal to isolate in the order of 60–70% (A. K. Smith, "Vegetable Protein Isolates," in Wm. M. Altschul (Editor) "Processed Plant Protein Foodstuffs," Academic Press, New York, 1958).

For many practical purposes such as bread fortification or meat extension, vegetable protein concentrates have been adopted as an alternative to the more expensive pure protein isolates. Vegetable protein concentrates are the products obtained from oilseeds after removal of the hulls, the oil and most of the non-protein water soluble constituents. The protein content of the dried concentrate usually exceeds 70%, the remainder being primarily insoluble polysaccharides such as cellulose and hemicelluloses. For example, in the manufacture of soybean protein concentrates the removal of water soluble materials from defatted soymeals is done under conditions assuring minimal solubility of the proteins, either by leaching with water acidulated to pH 4.5, by extracting with aqueous alcohol of 60–80% concentration, or by heat denaturation of the proteins prior to a water extraction. The soybean protein concentrates prepared by such methods have similar gross chemical compositions, but only the concentrates prepared by acid leaching retain the proteins in a native, water dispersible state.

The proteins prepared as described above usually contain varying amounts of phytic acid. Phytic acid, the hexaphosphate ester of myo-inositol, is a natural component of plant seeds where it occurs in the form of calcium and magnesium salts. During the isolation of proteins from defatted oilseed meals, a substantial amount of phytic acid coprecipitates with the proteins at the isoelectric point in the form of protein:phytic acid complexes in which the phytic acid is strongly bound to the basic groups of lysine, histidine and arginine of the proteins. For example, a soybean protein isolate usually contains 0.8 gram of phytate phosphorous per 100 grams of protein, an amount representing as much as 60% of the total phosphorous present in the seed.

The preparation of protein isolates free of phytic acid is highly desirable, particularly if such proteins are intended for human nutrition. The removal of phytic acid from protein isolates or from seed materials prior to extraction of the proteins is a problem that has attracted attention in the past. Phytic acid is a strong chelating agent that can immobilize metals of biological importance such as calcium, magnesium, iron and zinc. When present in substantial amounts in the diet, phytic acid can interfere with the normal intestinal absorption of such metals, leading to a series of deficiency disorders. For example, the rachitogenic effect of cereal-based diets has been linked to the presence of phytic acid in cereals like wheat, corn and oats, thus requiring a supplement of both calcium and vitamin D to overcome that effect. Experiments on calcium resorption using $^{45}Ca$ have shown that for every 80 mg. of phytate phosphorous present in the diet, 240 mg. of calcium was needed for a normal calcium assimilation (F. Bonner et al., J. Nutrition 59, 393 (1956)).

The phytic acid present in diets including soybean protein isolate has been found also to interfere in the utilization of dietary zinc by monogastric animals (B. L. O'Dell and J. E. Savage, Proc. Soc. Exp. Biol. and Med. 103 (1960)), and for that reason zinc supplementation has become standard practice in the manufacture of infant formulas based on soybean protein isolates (R. C. Theuer and H. P. Sarett, J. Agr. Food Chem. 18, 913 (1970)).

It is an object of the present invention to provide an improved source of vegetable proteins adaptable for human consumption. It is a further object of the present invention to provide an improved process for preparing proteins adaptable for human consumption. It is another object of the present invention to provide a process for preparing proteins that are more suitable for human nutrition. It is an additional object of the present invention to provide proteins having low phytic acid content at process conditions more conducive to commercialization. These and other objects and features of the invention will be apparent from the detailed description of the invention that follows.

SUMMARY OF THE INVENTION

It now has been discovered that these and other objects of the present invention can be met by providing a process for preparing plant protein products having low phytic acid content that comprises subjecting protein from a protein source to ultrafiltration in the presence of a suitable chemical reagent and recovering a purified protein.

The purification of seed proteins by the process according to the present invention can be carried out with any defatted seed meal, in particular soybean, peanut, cottonseed, sesame and sunflower, in a broad range of pH between 2.0 and 11.0, at any temperature between 4° C. and 70° C., and using either aqueous extracts or suspensions of the meals in water as the protein source.

The selection of a suitable chemical reagent depends upon the pH at which the protein source is subjected to ultrafiltration. For example, when the pH is approximately in the range 4.5 to 7.0 the enzyme phytase may be employed. At least a part of the required amount of phytase may be present as a component of the protein source. For the removal of phytic acid by ultrafiltration when the pH is in the range approximately 2.0–4.5, the ultrafiltration should be conducted in the presence of a large excess of divalent cations such as calcium and magnesium ions. For pH in the range of approximately 7.0–11.0, the ultrafiltration should be conducted in the presence of a strong chelating agent such as ethylenediaminetetraacetic acid (EDTA), nitrilotriacetic acid (NTA), 2,2'-ethylenedioxybis (ethyliminodiacetic) acid (EGTA), iminodiacetic acid (IDA) and the like, in concentrations in the range 0.05 M–0.50 M. Of course the chemical reagent employed in any particular process will depend upon the precise process conditions, and the selection of a suitable chemical reagent can be made readily by one skilled in the art. Also, in the practice of the invention one skilled in the art will recognize that to obtain optimum removal of phytate it may be necessary to adjust the pH of the protein source.

The term ultrafiltration describes the process of dialysis under a pressure gradient across a semipermeable membrane, and is being also referred to as diafiltration in the specialized literature. The fractionation by this procedure of a mixture of solutes dispersed in an appropriate solvent like water will depend on the molecular dimensions of the solutes in relation to the porosity of the membrane used for such purpose. For the purification of crude extracts of seed proteins, good protein retentions can be achieved by using membranes of molecular weight cut-off limits of 300,000 daltons to as low as 10,000 daltons. The extensive washing with water at the appropriate conditions of pH, temperature and pressure can remove from the system the permeable components like sugars, salts, non-protein nitrogenous compounds and phytic acid, leaving over the membrane a retentate comprised of proteins of high chemical purity.

BRIEF DESCRIPTION OF THE DRAWINGS

In the drawings:

FIG. 3 illustrates the effect of phytic acid content on the solubility of the digest of two soybeans protein isolates treated with the enzyme Molsin, an acid protease produced by the mold *Aspergillus saitoi*.

FIG. 4 illustrates the effect of phytic acid content on the solubility of the digest of soybean protein isolates treated with Thermolysin, an alkaline protease of *Bacillus thermoproteolyticus*.

FIG. 5 illustrates the observed time course of the phytate permeation in a series of ultrafiltration experiments.

FIG. 6 illustrates the effect of calcium ions on ultrafiltration conducted at pH 3.0.

DETAILED DESCRIPTION OF THE INVENTION

Figure 1:
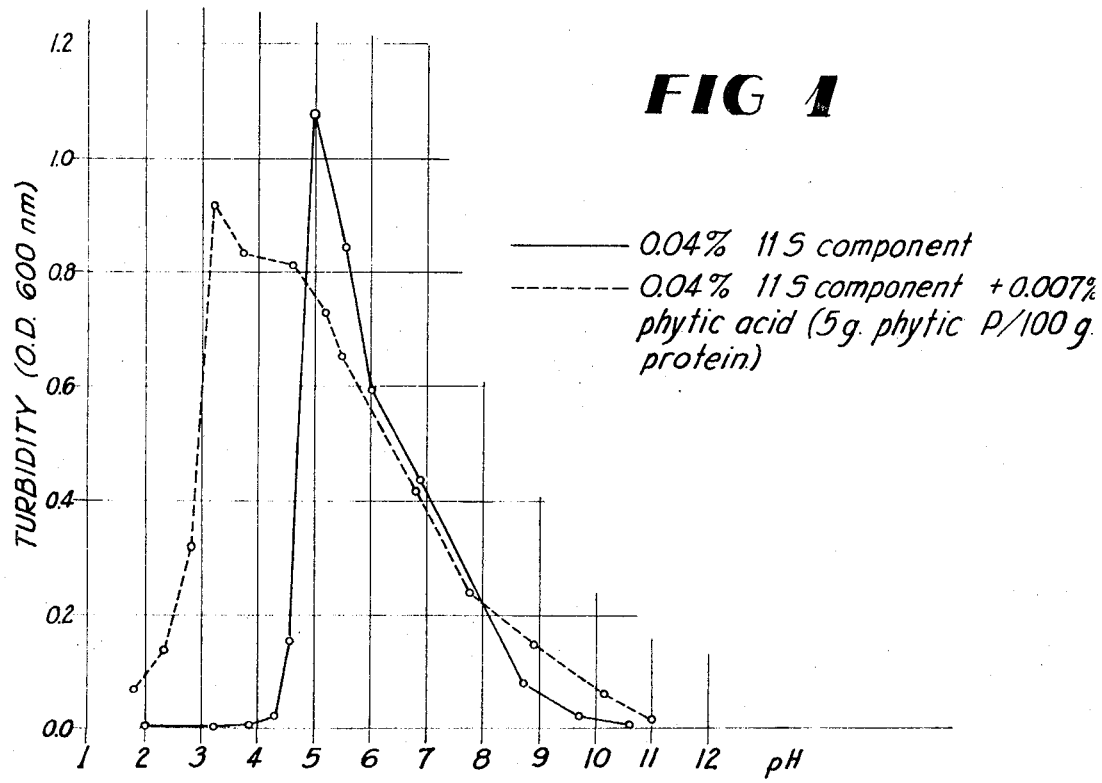
FIGS. 1 and 2 illustrate the changes in solubility as a function of pH when phytic acid is added to aqueous solutions of conglycinin (9S) and glycinin (11S) components, the two major globulins present in soybeans.
Figure 2:
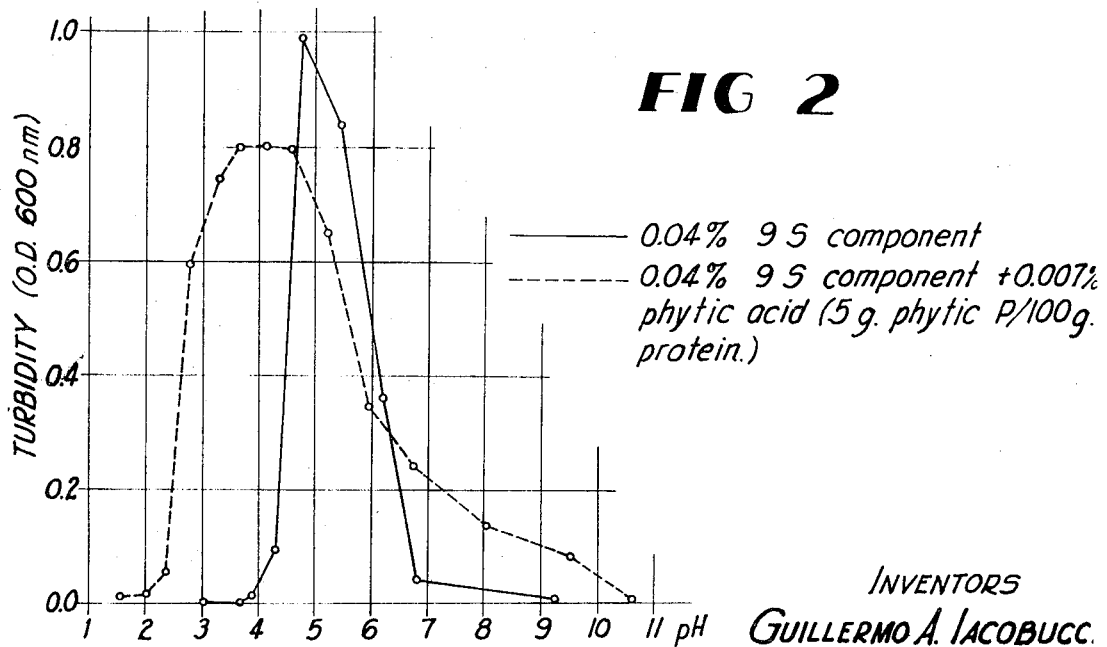

The effect of phytic acid on the solubility of vegetable proteins is illustrated in FIGS. 1 and 2, reproducing the changes in solubility as a function of pH when phytic acid is added to aqueous solutions of conglycinin (9S) and glycinin (11S) components, the two major globulins present in soybeans. In both cases the presence of phytic acid causes a shift of the insolubility region to lower pH values, reducing considerably the solubility of the proteins in the pH region 2.5–4.5. This protein:phytic acid interaction is a general phenomenon observed with many other proteins (J. E. Courtois, Rev. Esp. Fisiol. 13, 59 (1957)). In the case of low molecular weight proteins such as α-lactalbumin and β-lactoglobulin having high solubility at pH 3.0–5.0, the addition of phytic acid results in the formation of an insoluble complex.

The precipitation reaction caused by phytic acid is of importance to the preparation of protein hydrolysates. For example, when a protein without phytic acid or with low phytic acid content is subjected to the action of a highly specific endopeptidase such as pepsin, and the reaction is stopped when 15% of the peptide bonds are hydrolyzed, it is usually found that a substantial amount of the total nitrogen can be recovered in solution after the system is adjusted to pH 4.5. By conventional gel permeation chromatography it is possible to prove that the soluble fraction is made of a mixture of peptides ranging in size between 5,000 and 10,000 daltons. When the same reaction is conducted with proteins containing high amounts of phytic acid no change in the rate of proteolysis is observed, but the recovery of soluble peptides at pH 4.5 is substantially reduced. In this case, the presence of phytic acid causes the precipitation of peptides that otherwise would remain in solution at pH 4.5. Such phenomenon is of a general nature, occurs with most proteins and proteases and is observable at different degrees of proteolysis within a particular reaction.

FIG. 3 illustrates the effect of phytic acid content on the solubility of digests of two soybean protein isolates treated with the enzyme Molsin, an acid protease produced by the mold *Aspergillus saitoi*. It can be seen that although the rate of proteolysis is identical for both proteins, the protein having the higher phytic acid content yields lower amounts of peptides soluble at pH 4.5, the difference in yield amounting to 17.5% after 30 hours of reaction. This behavior is not restricted to acid proteases, and has been observed as well with proteolysis conducted in alkaline media. FIG. 4 shows the effect of phytic acid during a similar experiment conducted with thermolysin, an alkaline protease of *Bacillus thermoproteolyticus*.

The data summarized in Table I show that phytic acid is best removed by dialysis at pH 5.5, that is, at a pH very close to the pH of optimum activity of the enzyme phytase present in the extract. The permeation of phytate phosphorous at pH 2 is quite low, due to the strong binding of phytate to the protonated basic groups of the protein. Binding of phytate above the isoelectric point (pH 5.0) of the protein is also strong at pH 8.5. In this pH range, the beneficial effect of ethylenediaminetetraacetic acid (EDTA) on phosphorous removal is evidence that calcium and magnesium ions may participate in the binding of phytic acid to the protein.

TABLE I.—PHYTATE REMOVAL FROM SOYBEAN MEAL EXTRACT BY EQUILIBRIUM DIALYSIS FOR 7 DAYS AT 25° C.

| pH | Dialysis bath solvent | Presence of 0.01 M EDTA | Percent total phosphorous removed | Phosphorous content (g. P/100 g. protein) |
|---|---|---|---|---|
| 8.5 | 0.03 M sodium borate buffer | No | 74 | 0.38 |
| 8.5 | do | Yes | 84 | 0.22 |
| 8.5 | 0.05 M tris HCl buffer | No | 61 | 0.58 |
| 8.5 | do | Yes | 75 | 0.34 |
| 5.5 | Water | No | 96 | 0.06 |
| 2.0 | Water (HCl) | No | 42 | 0.81 |

The removal of phytic acid observed under equilibrium dialysis conditions can be effected by running the dialysis in an ultrafiltration unit, with the inherent advantage of accelerated diffusion conditions and reduced membrane surface requirements. The experimental comparison of both conditions using the same crude extract of soybean proteins, under similar ratios of protein mass/membrane surface, has shown that the permeation of solutes under forced diffusion occurs at a rate 150 times faster than under conventional equilibrium dialysis conditions. FIG. 5 illustrates the observed time course of the phytate permeation in a series of typical ultrafiltration experiments done with aqueous extracts of defatted soybean meals, washed at different pH values over a membrane having a cut-off of 30,000 daltons, at a temperature of 65° C. The percent phosphorous retained by the proteins is plotted against $$V_D = \frac{V_F}{V_R},$$

mulated in both ultrafiltrates, clearly indicate that such enzyme plays an important role in the mechanics of phosphorous permeation at pH 5.0.

As mentioned before, the removal of phytic acid by ultrafiltration in the pH range 2.0–4.5 is inefficient because of the strong association between protein and phytic acid, and the low activity of the enzyme phytase below pH 3.5. It is possible to remove phytic acid from the protein:phytic acid complex at pH below about 4.5 by conducting the ultrafiltration in the presence of a large excess of divalent cations like calcium and magnesium ions. The phenomenon is a displacement exerted by the divalent cations, in competition with the protonated basic groups of lysine, histidine and arginine residues for the electrostatic binding of the phytate anions. For example, the complete displacement of phytic acid from the stoichiometric complex soybean protein: phytic acid at pH 3.0 requires an excess of at least 70 equivalents of calcium ion per equivalent of charged basic group present in the protein.

TABLE II.—EFFECT OF PHYTASE ACTIVITY UPON PHOSPHOROUS REMOVAL DURING DIAFILTRATION
[Deionized water, pH 5.0, 65° C.]

| | Unboiled extract (with phytase) | | | (Boiled extract without phytase) | | |
|---|---|---|---|---|---|---|
| | Starting extract | Final retentate | Ultrafiltrate ($V_D=10.2$) | Starting extract | Final retentate | Ultrafiltrate ($V_D=14.2$) |
| g. P/100 g. protein | 1.48 | 0.15 | | 1.30 | 0.34 | |
| Total P (mg.) | 335 | 34 | 309 | 334 | 87 | 247 |
| $\frac{P_i}{\text{Total P}} \times 100$ (percent) | 13 | 34 | 46 | 10 | 0.4 | 16 |
| Percent total P removed from extract | | | 92 | | | 74 |

$V_D$ meaning the number of retentate volumes ($V_R$) collected as ultrafiltrate ($V_F$). The permeability of phytate at pH 5.0 follows closely the ideal behavior of a fully permeable substance. By departing from this critical pH, the extent of phytate removed is significantly reduced unless EDTA is present under alkaline conditions.

In order to extract efficiently the proteins from a defatted seed meal, the defatting of the raw seed should be done under mild temperature conditions. Such conditions not only preserve the high water dispersibility of the proteins, but also retain the activity of the many enzymes present in the seed, in particular the enzyme phytate which is important for the practice of the invention at pH 5.0 or thereabout.

Using sodium phytate as substrate, it is possible to demonstrate the presence of phytase activity in seed protein extracts by measuring the liberation of inorganic phosphate ($P_i$) at the optimal conditions of pH and temperature. Moreover, this phytase activity is totally destroyed by boiling the extract for 15 minutes at pH 8.5. The optimum pH of plant seed phytases is 5.2–5.6 (J. Courtois, Bull. Soc. Chim. Biol. 33, 1073 (1951)) and is coincidental with the pH 5.0 found for the optimal removal of phytic acid by ultrafiltration. The ultrafiltration experiment reproduced in Table II shows that the removal of phytate phosphorous from a heat inactivated soybean protein extract is less efficient than that of an unboiled control having phytase activity. The differences in the amount of $P_i$, a product of phytase action, accumulated FIG. 6 illustrates the different ultrafiltration behaviour of the phytate phosphorous of a soybean meal extract at pH 3.0, in the presence and absence of calcium ions. Carrying out protein purifications at an acid pH has the additional advantage of minimizing the risk of bacterial contamination during the ultrafiltration step.

This invention can be practiced equally well by using aqueous suspensions of defatted seed meals instead of the prefiltered water extracts. In such case the final product shows a protein content of 75–87% and has the chemical composition and functional characteristics of a protein concentrate. The use of ultrafiltration techniques is an efficient way to manufacture protein concentrates low in phytic acid from defatted seed meals. The advantages are clear when the protein of removing phytic acid while keeping nitrogen retention high is comparatively examined on the same seed material by using ultrafiltration versus the conventional process of leaching with water acidulated to pH 4.5. The data of Table III illustrate the differences observed during the preparation of soybean meal concentrates by both procedures. In the case of the conventional process, the acid leaching was repeated five times using an overall amount of water equal to the total filtrate collected in the ultrafiltration procedure. Prior to the acid washing, the sample was incubated at pH 5.0 and 65° C. for the same length of time used during the ultrafiltration of the other sample, in order to submit both samples, equally, to the action of the enzyme phytase.

TABLE III.—PREPARATION OF SOYBEAN PROTEIN CONCENTRATES

| | Dried concentrate | | | |
|---|---|---|---|---|
| | Percent N retained | Percent P removed | Percent protein | Percent phos. |
| (1) Ultrafiltration: 6% meal suspension, dialyzed against water pH 5.0, at 65° C. | 89.9 | 83.0 | 78.7 | 0.24 |
| (2) Acid leaching: 6% meal suspension, incubated at PH 5.0, 65° C., then washed 5 times with water pH 4.5 | 89.2 | 48.3 | 77.6 | 0.47 |

The present invention may be carried out to produce vegetable proteins of high nutritional quality suitable for human consumption, and may be adapted to provide high quality vegetable protein isolates in high yield, the products being characterized by high purity (greater than 90% protein) and for low phytic acid content (less than 3%) useful for human consumption as such, for the preparation of high purity protein isolates and for the manufacture of protein hydrolysates.

The invention furthermore makes it possible to make seed protein isolates and concentrates by a procedure which utilizes common reagents and operations familiar to the food processing industry, and which obtains the desired products in a nutritionally unimpaired form.

The protein in complexes of protein:phytic acid made from sources other than oilseeds can also be purified by the process of this invention. For example, the proteins present in solution in bovine milk's whey, mainly β-lactoglobulin and α-lactalbumin, can be recovered in high yield by addition of phytic acid to give an insoluble protein:phytic acid complex. The recovery of a pure protein fraction from such complex can be achieved by displacing the phytic acid with an excess of divalent cations like calcium or magnesium at pH 3.0, following the conditions outlined above.

In a typical embodiment of this invention a seed protein is first extracted in an aqueous alkaline medium from a finely ground defatted seed meal, under conditions of water:meal ratios conducive to an optimal extraction. The alkalizing agent may be, for example, sodium hydroxide, potassium hydroxide, sodium carbonate, potassium carbonate, or any other water soluble alkaline reagent such as ammonium hydroxide or solutions of water soluble alkylamines. The concentration of the alkalizing reagent should be such as to allow the alkaline extraction to proceed in the pH range of 8.0-12.0. Any suitable ratio of seed meal source to alkalizing reagent solution can be used, but slurries of 1:5 to 1:10 weight to volume ratio are generally used. Higher ratios can be used. The temperature is usually kept below 40° C., and preferably at about room temperature (22-25° C.). The extraction is preferably carried out with stirring or other suitable agitation in order to facilitate the contact of the protein source with the extracting agent. For the preparation of a protein isolate it is necessary, once the dispersion of the proteins in the aqueous phase is completed, to remove the insoluble material through filtration, centrifugation or any other convenient method. If such separation is not carried out the practice of the invention can be conducted equally well, but the composition of the final product will correspond to that of a protein concentrate. Prior to the ultrafiltration, the extract is adjusted to pH 5.0 by addition of a convenient inorganic or organic acid. Suitable acids include acids commonly accepted in processing food for human consumption such as hydrochloric acid, phosphoric acid, citric acid, lactic acid, fumaric acid, malic acid, itaconic acid and the like.

Although the removal by ultrafiltration of neutral soluble materials like sugars can be done equally well at any pH in the broad range 2.0-11.0, the simultaneous removal of phytic acid requires the careful adoption of the optimal pH. As explained above, pH 5.0 is conducive to a highly efficient removal of phytate phosphorous by taking advantage of (a) maximal rate of phytase activity and (b) minimal interaction between isoelectric protein and phytic acid. By practicing the invention in a slightly modified manner, phytic acid removal can be achieved also at pH values over and below pH 5.0. For ultrafiltrations to be carried out in the pH range 7.0-11.0 it is necessary to add to the protein extract a strong chelating agent. These agents can displace calcium from the ternary complex protein:calcium:phytic acid which naturally occurs for example in a water extract of defatted soybean meal, thus facilitating the diffusion of the phytate ions during the dialysis. Conversely, the extract can be processed in the pH range 2.0-4.5 in the presence of soluble salts of the metals of the Group II-A of the Periodic Table, more in particular calcium and magnesium salts, in a concentration within the range 0.1M-0.5M. At this pH the divalent cations can displace phytic acid from the protein, to form the freely diffusible calcium or magnesium phytate chelates.

The ultrafiltration can be conducted in any commercially available unit, using membranes made of cellulose acetate or suitable synthetic organic polymers, cast in the form of sheets or in tubular configurations. The protein extract adjusted to the proper pH is introduced to the reservoir of the unit with the protein either fully dispersed or in the form of a suspension, according to the conditions of pH and protein concentration adopted. The protein concentration of the extract can be greatly varied, but for most purposes concentrations of 3%-15% are adequate. The ultrafiltration can be run at temperatures in the range 4° C.-70° C., the higher temperatures being preferred for (a) better control of the asepsis of the system and (b) keeping the flux of filtrate as high as possible, in order to shorten the operation time. The choice of the membrane to be used must be made in relation to the desired porosity characteristics and its chemical resistance to the conditions of pH and temperature adopted. In general, a membrane porosity range within molecular weight cut-off limits of 10,000-30,000 daltons is useful, but for most purposes the lower limit is preferred in order to achieve a maximum retention of protein in the system. The ultrafiltration is generally conducted at a positive pressure that usually varies according with the permeation characteristics of the membrane used. For membranes with permeation 10,000-30,000 daltons, pressures between 15-40 p.s.i.g. will suffice. For membranes with permeation limits above 30,000 daltons, correspondingly lower pressures may be employed as will be readily apparent to one skilled in the art. During the ultrafiltration in a typical batch process, the protein suspension is forced to circulate over the surface of the membrane, the liquid lost as filtrate being continuously replaced by addition of deionized water in order to keep the retentate at a constant volume. This washing procedure is continued until most of the diffusible materials are removed, five volumes of water per volume of protein suspension being sufficient for the removal of 85% of the phytic acid present in the system. The high retention of protein nitrogen achieved in this step minimizes the risk of amino acid imbalance through chemical fractionation, thus assuring the nutritional quality of the proteins present in the extract. At the end of the process, the purified protein can be isolated by freeze-drying, spray-drying or any other convenient drying procedure, to provide the purified seed protein in a dry powder form, suitable for the addition or in the compounding of human foods as a protein nutrition source. Of course it will be apparent that the process may be operated continuously by providing a continuous feed of protein, water and chemical reagents as required.

The present invention will be more fully understood by reference to the following examples in which all parts are by weight unless indicated otherwise.

EXAMPLE 1

Soybean protein isolate

Defatted soybean flakes (8.94% N, 0.80% P, 1.43 g. P/100 g. protein), 440 g., were extracted with 15 parts of water, the suspension being made alkaline to pH 8.6 using 5 N NaOH and the insolubles removed by filtration of the suspension through a 100 mesh screen. The insolubles were reextracted with 5 parts of water with respect to the original meal, the second extract obtained in the same fashion as the first, and the two extracts combined. The pH of the pooled extract was lowered to 5.0 with 5 N HCl, and the resulting suspension kept at 4° C. overnight. The following day, over a period of 9.3 hrs. at 65° C., pH 5 and 20 p.s.i.g., the suspension was concentrated by ultrafiltration from 8.57 l. to 4.1 l. over 0.25 ft.$^2$ of cast cellulose acetate anisotropic membrane having a MW cut off between 10,000 to 15,000. The membrane was embodied within the Amicon TC–1 apparatus. After concentration of the suspension to 4.1 l., demineralized water (20.35 l.) was then passed through the suspension at pH 5, 65° C. and 20 p.s.i.g. over a period of 39 hrs. The solids retained over the membrane were recovered by freeze-drying to afford 209 g. of isolate being 14.85% N, 0.35% P and 0.38 P/100 g. protein. Recovery in the isolate based on the meal was 47.5% by weight, 78.8% by nitrogen and 20.6% by phosphorous. A comparison of the essential amino acid composition of the isolate to that of a commercial isolate [Meyer, E. W., "Soy Protein Concentrates and Isolates, p. 147 in Proceedings of International Conference on Soybean Protein Foods, held at Peoria, Ill., Oct. 17–19, 1966, ARS 71–35 (1967)] is shown in the table below. Tryptophan, although an essential amino acid, has not been included in the table.

Essential Amino Acid Content of Soybean Protein Isolates

| Amino acid; g./16 g. N | Soybean protein isolate | |
| --- | --- | --- |
|  | Commerical | This example |
| Lysine | 6.0 | 6.9 |
| Cystine (as cysteic acid) | 0.9 | –1.4 |
| Valine | 5.0 | 5.2 |
| Methionine | 1.0 | 1.4 |
| Isoleucine | 4.9 | 5.3 |
| Leucine | 8.1 | 8.1 |
| Phenylalanine | 5.6 | 5.5 |

EXAMPLE 2

Soybean protein concentrate

Defatted soybean flour (less than 100 mesh, 9.6% N, 0.80%, 1.33 g. P/100 g. protein), 210 g., was suspended in 3.5 l. demineralized water, the pH adjusted to 8.5 using 5 N NaOH and stirred for an hour at 25°. The pH was then lowered to 5.0 with 5 N HCl. The Amicon TC–1 apparatus equipped with 0.25 ft.$^2$ of Amicon PM–30 membrane (MW cut-off of 30,000) was charged with the flour suspension (3.5 l.) and 18.0 l. demineralized water at pH 5.0 was passed through the suspension at 65° C. and 40 p.s.i.g. over a period of 18 hrs. The resulting flour retained by the membrane was freeze-dried to yield 143.9 g. of soybean protein concentrate (12.6% N, 0.24% P 0.30 g. P/100 g. protein). Recovery in the concentrate based on the flour was 68.5% by weight, 89.9% by nitrogen and 17.0% by phosphorous.

EXAMPLE 3

Cottonseed protein isolate

Defatted glandless cottonseed flour (10.36% N, 1.48% P, 2.29 g. P/100 g. protein), 11 g., was homogenized with 110 ml. water, and the pH of the resulting suspension increased to 11.0 with 5 N NaOH. After the alkaline suspension had been stirred for 30 min., the bulk of insolubles were removed by passage of the suspension through a 100 mesh screen. The retained solids were rewashed with 40 ml. of water. Both filtrates were pooled and centrifuged for 15 min. at 1800×g. The pH of the supernatant was lowered to 7.0 with 5 N HCl, and the resulting solution placed in a boiling water bath for 10 min. A 50 ml. sample of the boiled suspension was made 0.5 M with respect to CaCl$_2$, and the pH of the resulting suspension reduced to 3.0 using 5 N HCl. A 25 ml. portion of the acidified extract was added to 125 ml. of 0.5 M CaCl$_2$ acidulated to pH 3.0 with 2 N HCl contained within an Amicon Model 401 ultrafiltration cell equipped with 0.05 ft.$^2$ of Amicon PM–30 membrane (MW cut-off of 30,000). After 2.5 hrs. of ultrafiltration at 25° C. at 10 p.s.i.g., 125 ml. of ultrafiltrate were collected. Water acidulated to pH with 1 N HCl, was then passed through the concentrated retentate overnight at 25° C. A volume of 980 ml. ultrafiltrate was collected. Analysis of the extract prior to ultrafiltration and the ultrafiltrates indicated that 54.8% of the phosphorous was removed by ultrafiltration and 89.5% of the nitrogen was retained after ultrafiltration. Therefore, the protein retained by ultrafiltration contained 0.19 g. P/100 g. protein as compared to 0.49 g. P/100 g. P prior to ultrafiltration. The yield of protein retained by the membrane was 72.4% of that present in the defatted meal.

EXAMPLE 4

Cottonseed protein concentrate

Defatted glandless cottonseed flour (10.36% N, 1.48% P 2.29 g. P/100 g. protein), 60 g., was suspended in 1 l. demineralized water and boiled 15 min. The pH of the cooled (25° C.) suspension was adjusted to 5.0 using 5 N HCl and over a period of 10 hrs. 14.3 l. of demineralized water at pH 5.0 was passed through the suspension at 65° C. and 40 p.s.i.g. An Amicon TC–1 apparatus having 0.25 ft.$^2$ of PM–30 membrane was employed for the ultrafiltration process. The ultrafiltered suspension retained by the membrane was freeze-dried to yield 50.7 g. of cottonseed protein concentrate (14.1% N, 0.65% P, 0.74 g. P/100 g. protein). Based on the original flour, recovery was 82.7% by weight, 84.5% by nitrogen and 38.6% by phosphorous.

EXAMPLE 5

Sesame protein isolate

Defatted sesame meal (9.08% N, 0.94% P, 1.66 g. P/100 g. protein), 10 g., was extracted in the same manner as defatted cottonseed meal cited in Example 3. The pH of the sesame meal extract was lowered from 11 to 7 with 5 N HCl and the neutralized extract placed in a boiling water bath for 10 min. The boiled suspension was made 0.5 M with respect to CaCl$_2$ and the pH lowered to 3 with 5 N HCl. A 25 ml. portion of the acidified extract was added to 125 ml. 0.5 M CaCl$_2$ adjusted to pH 3 with 2 N HCl contained within an Amicon Model 401 ultrafiltration cell equipped with 0.05 ft.$^2$ Amicon PM–30 membrane (MW cut-off of 30,000). After 125 ml. of ultrafiltrate had been collected using a pressure of 10 p.s.i.g., 150 ml. of water acidulated with 1 N HCl to pH 3 were added to the retentate and, at a pressure of 10 p.s.i.g., 150 ml. ultrafiltrate were collected. Analysis of the extract prior to ultrafiltration and both ultrafiltrates indicated that 44.2% of the phosphorous was removed by ultrafiltration and 87.1% of the extracted nitrogen was retained. Accordingly, the protein retained after ultrafiltration contained 0.17 g. P/100 g. protein as compared to 0.26 g. P/100 g. protein in the extract prior to ultrafiltration. The yield of protein retained by the membrane was 68.0% of that present in the defatted meal.

EXAMPLE 6

Sesame protein concentrate

Defatted sesame flour (9.08% N, 0.94% P, 1.66 g. P/100 g. protein), 60 g., was suspended in 1 l. demineralized water, the pH adjusted to 7.0 using 5 N NaOH and the resulting suspension boiled for 15 min. After the material had cooled to 25° C., the pH was adjusted to 4.5 with 5 N HCl. Over a period of 24 hrs., 10.7 l. of demineralized water at pH 4.5 were passed through the suspension at 65° C. at 40 p.s.i.g. in an Amicon TC-1 apparatus equipped with 0.25 ft.² of PM-30 membrane (MW cut-off of 30,000). The material retained over the membrane was recovered by freeze-drying to result in 48.4 g. of sesame protein concentrate (10.1% N, 0.47% P, 0.74 g. P/100 g. protein). Recovery in the concentrate based on the original flour was 80.7% by weight, 89.8% by nitrogen and 40.7% by phosphorous.

EXAMPLE 7

Soybean protein isolate

Defatted soybean flakes (236 g., containing 132 g. of protein [N×6.25], and being 0.80% P: 1.38 g. P/100 g. protein) were extracted with 20 parts by weight of 0.05 M EDTA (Na+) at pH 8.6, 5 N NaOH was used to maintain pH at this value. Insolubles were removed by filtration of the suspension through a 100 mesh screen. The insolubles were re-extracted twice with 5 parts by weight of the original flakes using 0.05 M EDTA (Na+) at pH 8.6, the 100 mesh screen being used to remove insolubles after each extraction. The three extracts were pooled and clarified by centrifugation. The clarified extract (6 l.) was concentrated to a volume of 3.2 l. at 65° and 40 p.s.i.g. in an Amicon TC-1 ultrafiltration apparatus equipped with 0.25 ft.² of Amicon PM-30 membrane. Over a period of 39.5 hrs., 36.4 l. of 0.01 M $NaHCO_3/Na_2CO_3$, pH 8.6, were passed through the concentrated extract at 65° and 40 p.s.i.g. in the above-mentioned ultrafiltration apparatus. The resulting protein retained by the membrane was 95.0 g. (72% of that present in the meal) and contained 0.45 phosphorous/100 g. protein.

EXAMPLE 8

Soybean protein isolate

Defatted soybean flakes (8.94% N, 0.80% P, 1.43 g. P/100 g. protein), 50 g., were homogenized with 750 ml. demineralized water, and the pH of the resulting suspension increased to 8.6 using 5 N NaOH. After being stirred for 30 min., the suspension was filtered through a 100 mesh screen to remove insolubles. The residue was again extracted with 250 ml. demineralized water and the insolubles removed by filtration of the suspension through a 100 mesh screen. The two extracts were pooled and sufficient solid $CaCl_2·2H_2O$ added to make the extract 0.5 M with respect to calcium. The pH of the resulting extract was lowered to 3 with 2 N HCl. Over a period of 7.8 hrs., 4.42 l. of 0.5 M $CaCl_2$ adjusted to pH 3 with 2 N HCl was passed through the suspension at 25° C. and 40 p.s.i.g. using an Amicon TC-1 ultrafiltration apparatus outfitted with 0.25 ft.² of Amicon PM-30 membrane (MW cut-off of 30,000). Under the same conditions of ultrafiltration, 14 l. of demineralized water acidulated to pH 3 with 2 N HCl was next passed through the suspension to remove calcium. The resulting suspension retained over the membrane was freeze-dried to afford a soybean protein isolate having 15.3% N and 0.19% P (0.20 g. P/100 g. protein). Based on analysis of the ultrafiltrates, recovery in the isolate was 45.6% by weight, 78.2% by N and 7.0% by phosphorous in comparison to the soybean flakes.

EXAMPLE 9

Peanut protein isolate

Defatted peanut flour (10.51% N, 0.85% P, 1.29 g. P/100 g. protein), 101 g., was extracted exactly in the same fashion cited in Example 1 for soybean flakes to yield 1.95 l. of pooled extract. The pH of the extract was lowered to 5.0 from 8.6 using 5 N HCl. The resulting suspension was placed in an Amicon TC-1 ultrafiltration apparatus equipped with 0.25 ft.² of Amicon PM-30 membrane. Over a period of 17 hrs., 13.5 l. of demineralized water at pH 5.0 were passed through the suspension at 65° C and 40 p.s.i.g. Material retained by the membrane was freeze-dried to afford 46.5 g. of peanut protein isolate (14.3% N, 0.13% P, 0.15 g. P/100 g. protein). Based on the flour extracted, recovery in the isolate by weight is 46.0%, by nitrogen, 68.0% and by phosphorous, 16.4%.

EXAMPLE 10

Peanut protein concentrate

Defatted peanut flour (10.5% N, 0.85% P, 1.29 g. P/100 g. protein), 60 g., was suspended in 1 l. demineralized water and the pH increased to 8.5 with 5 N NaOH. The alkaline suspension was stirred 0.5 hr., and finally the pH lowered to 5.0 using 5 N HCl. Over a period of 16.5 hrs., 17.5 l. of demineralized water at pH 5.0 was passed through the suspension at 65° C. and at 40 p.s.i.g. The suspension was contained in an Amicon TC-1 ultrafiltration apparatus having 0.25 ft.² of Amicon PM-30 membrane. The ultrafiltered suspension, which was retained by the membrane, was freeze-dried to yield 52.2 g. of peanut protein concentrate (12.0% N, 0.38% P, 0.51 g. P/100 g. protein). Based on the flour processed, recovery in the concentrate was 87.0% by weight, 90.3% by nitrogen and 35.6% by phosphorous.

EXAMPLE 11

Bovine milk whey protein from phytic acid complex

Phytic acid was removed from a milk whey protein-phytic acid complex by ultrafiltration to afford purified whey protein. A milk whey protein-phytate complex (12.86% N, 2.46% P, 3.06 g. P/100 g. protein) was added to 25 ml. of 0.5 M $CaCl_2$, and the pH adjusted to 3.0 with 1 N HCl. This solution was placed in an Amicon Model 401 ultrafiltration cell having 0.05 ft.² of Amicon PM-10 membrane (MW cut-off of 10,000). After 125 ml. of 0.5 M $CaCl_2$ adjusted to pH 3 with 2 N HCl were added to the complex, the solution was concentrated by ultrafiltration at 25° C. and 10 p.s.i.g. to 25 ml. At this point, 125 ml. of water acidulated to pH 3.0 with 1 N HCl were added to the retentate contained within the ultrafiltration cell, and 125 ml. of ultrafiltrate collected at 10 p.s.i.g. at 25° C. Analysis of the complex prior to ultrafiltration and both ultrafiltrates indicated that 82% of the phosphorous (phytate) was removed by ultrafiltration whereas 99.8% of the nitrogen (protein) was retained over the membrane to result in a whey protein having 0.55 g. P/100 g. protein.

We claim:

1. A process for preparing plant protein products having low phytic acid content that comprises subjecting protein from a protein source to ultrafiltration at a pH in the range of 2.0 to 11.0 in the presence of an added suitable chemical reagent, the suitable chemical reagent being a large excess of divalent cations when the pH is in the range of 2.0 to 4.5, phytase when the pH is in the range of 4.5 to 7.0 and a strong chelating agent when the pH is in the range of 7.0 to 11.0 and thereafter recovering a purified protein.

2. A process according to claim 1 in which the strong chelating agent is selected from the group consisting of ethylenediaminetetraacetic acid, nitrolotriacetic acid, 2,2'-ethylenediaxybis, (ethyliminodiacetic) acid, aminodacetic acid.

3. A process according to claim 1 which comprises conducting the ultrafiltration at a temperature in the range of 4° C. to 70° C.

4. A process according to claim 1 in which the protein source is a defatted seed meal.

5. A process according to claim 1 which comprises subjecting an aqueous suspension of defatted seed meal to the ultrafiltration.

6. A process according to claim 1 which comprises subjecting a prefiltered water extract of defatted seed meal to the ultrafiltration.

7. A process according to claim 1 which comprises conducting the ultrafiltration across a membrane having a molecular weight cutoff limit of 300,000 daltons or lower.

8. A process according to claim 7 in which the membrane has a molecular weight cutoff limit of 30,000 to 10,000 daltons.

9. A process according to claim 1 in which the divalent cations are magnesium ions or calcium ions present in a concentration of 0.1M–0.5M.

10. A process according to claim 1 which comprises adjusting the pH of the protein source prior to ultrafiltration.

11. A process according to claim 1 wherein the protein source is derived from soybean protein.

12. A process according to claim 1 wherein the protein source is derived from cottonseed protein.

13. A process according to claim 1 wherein the protein source is derived from peanut protein.

14. A process according to claim 1 wherein the protein source is derived from sesame protein.

References Cited

UNITED STATES PATENTS 3,622,556   11/1971   O'Connor _____ 99—17

FOREIGN PATENTS 361,346   9/1930   Great Britain _____ 99—17

OTHER REFERENCES

Fontaine, et al., J. Biol. Chem., vol. 164, pp. 487–507, 1946.

Nelson et al., Chem. Abs., vol. 71, #36748e, 1969.

Rondelet et al., Chem. Abs., vol. 51, #18463d, 1957.

A. LOUIS MONACELL, Primary Examiner

G. M. NATH, Assistant Examiner

U.S. Cl. X.R.

99—19; 195—4, 29; 260—123.5